US008897235B2

(12) United States Patent
Luo et al.

(10) Patent No.: US 8,897,235 B2
(45) Date of Patent: Nov. 25, 2014

(54) PROTECTION OF BROADCAST SIGNALS IN HETEROGENEOUS NETWORKS

(75) Inventors: Tao Luo, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 501 days.

(21) Appl. No.: 12/970,146

(22) Filed: Dec. 16, 2010

(65) Prior Publication Data

US 2011/0149894 A1 Jun. 23, 2011

Related U.S. Application Data

(60) Provisional application No. 61/288,154, filed on Dec. 18, 2009.

(51) Int. Cl.
*H04W 4/00* (2009.01)
*H04W 16/02* (2009.01)

(52) U.S. Cl.
CPC .................................. *H04W 16/02* (2013.01)
USPC ............ 370/329; 370/345; 370/347; 370/346

(58) Field of Classification Search
USPC .................................. 370/329, 345, 346, 347
See application file for complete search history.

(56) References Cited

U.S. PATENT DOCUMENTS

| 2007/0161347 | A1 | 7/2007 | Ma et al. | |
|---|---|---|---|---|
| 2009/0109907 | A1* | 4/2009 | Tsai et al. | 370/329 |
| 2009/0252077 | A1 | 10/2009 | Khandekar et al. | |
| 2009/0274077 | A1 | 11/2009 | Meylan et al. | |

FOREIGN PATENT DOCUMENTS

| CN | 101060702 A | 10/2007 |
|---|---|---|
| EP | 0946071 A2 | 9/1999 |
| JP | 2012531810 A | 12/2012 |
| WO | WO9963782 A1 | 12/1999 |
| WO | WO2006086788 A1 | 8/2006 |
| WO | WO-2010151424 A2 | 12/2010 |

OTHER PUBLICATIONS

International Search Report and Written Opinion—PCT/US2010/061131, International Search Authority—European Patent Office—Mar. 18, 2011.
Taiwan Search Report—TW099144473—TIPO—Jun. 6, 2013.
Motorola: "Heterogeneous Support for Reliable Downlink Control", 3GPP Draft; R1-093416—Heterogeneous Support for Reliable DL Control VFinal, 3rd Generation Partnership Project (3GPP), no. Shenzhen, China; 2009081 9, Aug. 19, 2009, XP050351702.
Qualcomm Europe: "Carrier Aggregation in Heterogeneous Networks", 3GPP TSG RAN WG1 #56bis, R1-091459, pp. 1-12, Seoul, Korea, Mar. 23-27, 2009.

(Continued)

*Primary Examiner* — Dady Chery
(74) *Attorney, Agent, or Firm* — Dalei Dong

(57) ABSTRACT

Certain aspects of the disclosure provide for the protection of broadcast signals in heterogeneous networks. As described herein, a first set of resources used for downlink transmission in a first cell may overlap with a second set of resources used for broadcast signals in a second cell. The broadcast signals may be protected by allocating a third set of resources for the downlink transmission in the first cell, wherein the third set of resources is based, at least in part, on the overlapping set of resources.

46 Claims, 7 Drawing Sheets

(56) References Cited

OTHER PUBLICATIONS

Qualcomm Europe: "Carrier Aggregation Operation in LTE-Advanced", 3GPP Draft; R1-083811, 3rd Generation Partnership Project (3GPP), Mobile Competence Centre; 650, Route des Lucioles; F-06921 Sophia-Antipolis Cedex; France, no. Prague, Czech Republic; 20080924, Sep. 24, 2008, XP050317135, [retrieved on Sep. 24, 2009] paragraph [02.2].

* cited by examiner

PROTECTION OF BROADCAST SIGNALS IN HETEROGENEOUS NETWORKS

CLAIM OF PRIORITY UNDER 35 U.S.C. §119

This application claims priority to U.S. Provisional Application No. 61/288,154, entitled "Protection Of Broadcast Signals In Heterogeneous Networks," filed Dec. 18, 2009, and assigned to the assignee hereof and expressly incorporated herein by reference.

BACKGROUND

1. Field of the Invention

This disclosure generally relates to communication and, more specifically, to power control in a multi-carrier wireless communication network.

2. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data to one or more UEs on the downlink and may receive data from one or more UEs on the uplink. On the downlink, a data transmission from the base station may observe interference due to data transmissions from neighbor base stations. On the uplink, a data transmission from a UE may observe interference due to data transmissions from other UEs communicating with the neighbor base stations. For both the downlink and uplink, the interference due to the interfering base stations and the interfering UEs may degrade performance.

SUMMARY

Certain aspects of the disclosure provide a method for wireless communications in a wireless communications network. The method generally includes determining a first set of resources for downlink transmission to one or more first user equipments (UEs) in a first cell, determining a second set of resources for use in transmitting broadcast signals to one or more second UEs in a second cell, where the first and the second set of resources comprise an overlapping set of resources that at least partially overlap in time and frequency, and allocating a third set of resources for the downlink transmission in the first cell, wherein the third set of resources is based, at least in part, on the overlapping set of resources.

Certain aspects of the disclosure provide an apparatus for wireless communications in wireless communications network. The apparatus generally includes means for determining a first set of resources for downlink transmission to one or more first user equipments (UEs) in a first cell, means for determining a second set of resources for use in transmitting broadcast signals to one or more second UEs in a second cell, where the first and the second set of resources comprise an overlapping set of resources that at least partially overlap in time and frequency, and means for allocating a third set of resources for the downlink transmission in the first cell, wherein the third set of resources is based, at least in part, on the overlapping set of resources.

Certain aspects of the disclosure provide an apparatus for wireless communications in wireless communications network. The apparatus generally includes at least one processor configured to determine a first set of resources for downlink transmission to one or more first user equipments (UEs) in a first cell, determine a second set of resources for use in transmitting broadcast signals to one or more second UEs in a second cell, where the first and the second set of resources comprise an overlapping set of resources that at least partially overlap in time and frequency, and allocate a third set of resources for the downlink transmission in the first cell, wherein the third set of resources is based, at least in part, on the overlapping set of resources; and a memory coupled with the at least one processor.

Certain aspects of the disclosure provide a computer-program product for wireless communications comprising a computer-readable storage medium having instructions stored thereon. The instructions generally executable by a processor for determining a first set of resources for downlink transmission to one or more first user equipments (UEs) in a first cell, determining a second set of resources for use in transmitting broadcast signals to one or more second UEs in a second cell, where the first and the second set of resources comprise an overlapping set of resources that at least partially overlap in time and frequency, allocating a third set of resources for the downlink transmission in the first cell, wherein the third set of resources is based, at least in part, on the overlapping set of resources.

DETAILED DESCRIPTION

Figure 1:
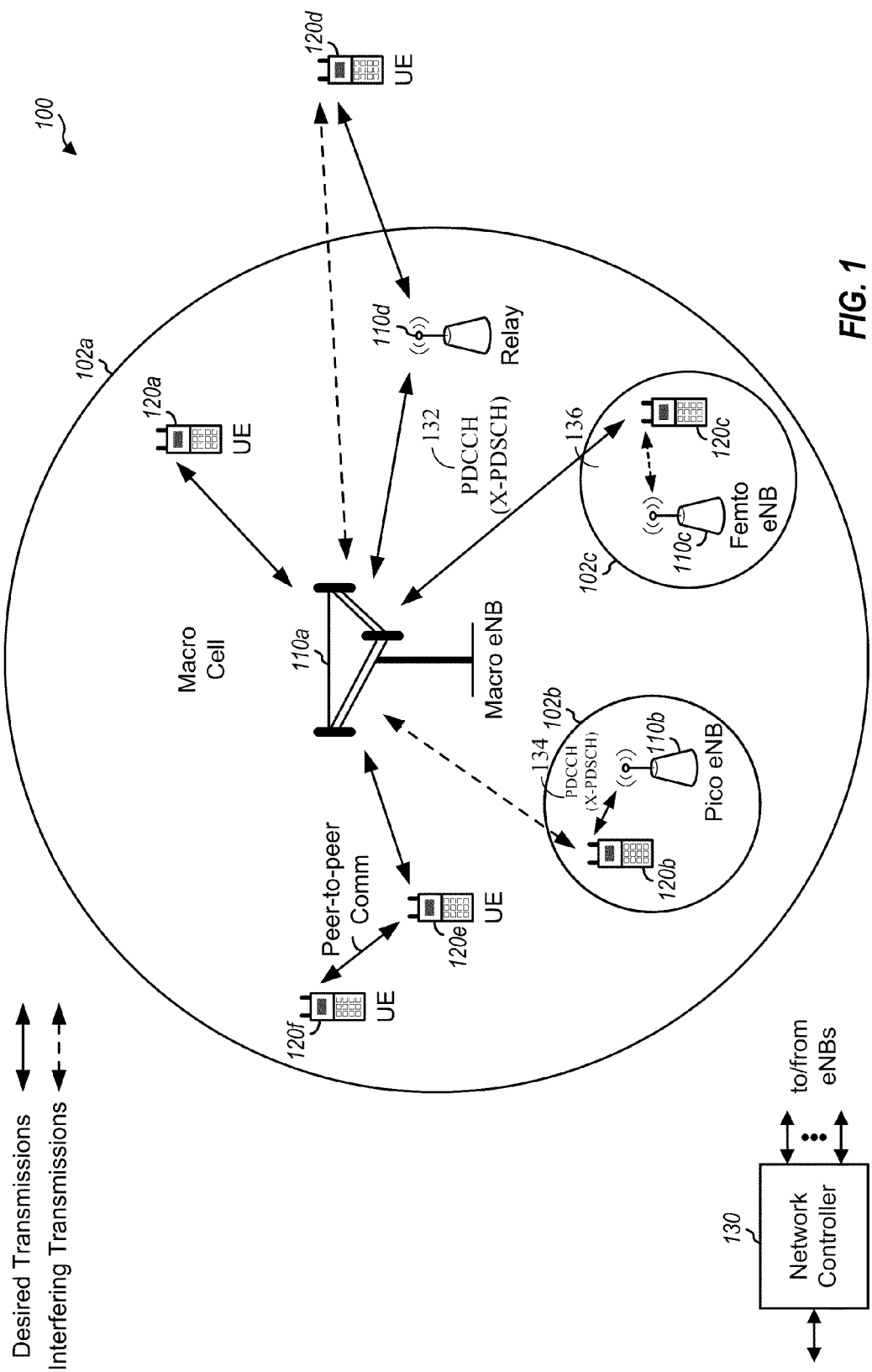
FIG. 1 illustrates an example heterogeneous wireless communications network, in accordance with certain aspects of the disclosure.

Various aspects are now described with reference to the drawings. In the following description, for purposes of explanation, numerous specific details are set forth in order to provide a thorough understanding of one or more aspects. It will be recognized, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, an eNodeB (eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization has similar performance and essentially the same overall complexity as those of OFDMA system. SC-FDMA signal has lower peak-to-average power ratio (PAPR) because of its inherent single carrier structure. SC-FDMA has drawn great attention, especially in uplink communications where lower PAPR benefits the mobile terminal in terms of transmit power efficiency.

FIG. 1 illustrates an example heterogeneous wireless network 100, in which various aspects of the disclosure may be practiced.

The wireless communication network 100 may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a home eNB (HeNB) or a femto eNB. In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station", and "cell" may be used interchangeably herein.

Wireless network 100 may also include relays. A relay may be an entity that can receive a transmission of data from an upstream station (e.g., an eNB or a UE) and send a transmission of the data to a downstream station (e.g., a UE or an eNB). A relay may also be a UE that can relay transmissions for other UEs. In the example shown in FIG. 1, a relay 110d may communicate with macro eNB 110a via a backhaul link and with a UE 120d via an access link in order to facilitate communication between eNB 110a and UE 120d. A relay may also be referred to as a relay eNB, a relay station, a relay base station, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage sizes, and different impact on interference in wireless network 100. For example, macro eNBs may have a high transmit power level (e.g., 5 to 40 Watts) whereas pico eNBs, femto eNBs, and relays may have lower transmit power levels (e.g., 0.1 to 2 Watts).

A network controller 130 may couple to a set of eNBs and may provide coordination and control for these eNBs. Network controller 130 may comprise a single network entity or a collection of network entities. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with macro eNBs, pico eNBs, femto eNBs, relays, etc. A UE may also be able to communicate peer-to-peer (P2P) with another UE. In the example shown in FIG. 1, UEs 120e and 120f may communicate directly with each other without communicating with an eNB in wireless network 100. P2P communication may reduce the load on wireless network 100 for local communications between UEs. P2P communication between UEs may also allow one UE to act as a relay for another UE, thereby enabling the other UE to connect to an eNB.

In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric.

A UE may operate in a dominant interference scenario in which the UE may observe high interference from one or more interfering eNBs. A dominant interference scenario may occur due to restricted association. For example, in FIG. 1, UE 120c may be close to femto eNB 110c and may have high received power for eNB 110c. However, UE 120c may not be able to access femto eNB 110c due to restricted association and may then connect to macro eNB 110a with lower received power. UE 120c may then observe high interference from femto eNB 110c on the downlink and may also cause high interference to femto eNB 110c on the uplink.

A dominant interference scenario may also occur due to range extension, which is a scenario in which a UE connects to an eNB with lower pathloss and possibly lower SINR among all eNBs detected by the UE. For example, in FIG. 1, UE 120b may be located closer to pico eNB 110b than macro eNB 110a and may have lower pathloss for pico eNB 110b. However, UE 120b may have lower received power for pico eNB 110b than macro eNB 110a due to a lower transmit power level of pico eNB 110b as compared to macro eNB 110a. Nevertheless, it may be desirable for UE 120b to connect to pico eNB 110b due to the lower pathloss. This may result in less interference to the wireless network for a given data rate for UE 120b.

Various interference management techniques may be used to support communication in a dominant interference scenario. These interference management techniques may include semi-static resource partitioning (which may be referred to as inter-cell interference coordination (ICIC)), dynamic resource allocation, interference cancellation, etc. Semi-static resource partitioning may be performed (e.g., via backhaul negotiation) to allocate resources to different cells. The resources may comprise subframes, subbands, carriers, resource blocks, transmit power, etc. Each cell may be allocated a set of resources that may observe little or no interference from other cells or their UEs. Dynamic resource allocation may also be performed (e.g., via exchange of over-the-air messages between cells and UEs) to allocate resources as needed to support communication for UEs observing strong interference on the downlink and/or uplink. Interference cancellation may also be performed by UEs to mitigate interference from interfering cells.

Wireless network 100 may support hybrid automatic repeat request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single HARQ interlace, which may include every Q-th subframes, where Q may be equal to 4, 6, 8, 10, or some other value. For asynchronous HARQ, each transmission of the packet may be sent in any subframe.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 100 may utilize FDD or TDD. For FDD, the downlink and uplink may be allocated separate frequency channels, and downlink transmissions and uplink transmissions may be sent concurrently on the two frequency channels. For TDD, the downlink and uplink may share the same frequency channel, and downlink and uplink transmissions may be sent on the same frequency channel in different time periods.

Protection of Broadcast Signals in Heterogeneous Networks

As illustrated, according to certain aspects, different eNBs in the heterogeneous wireless network 100 may be configured to "extend" the resources allocated to a physical downlink shared channel (PDSCH) for its UEs via the application of extension carriers and/or carrier segments. As illustrated, macro eNB 110a may allocate resources, via a PDCCH 132, in a manner that extends the PDSCH for a UE 120c by allocating a portion of a component carrier used by UEs served in the Femto cell 102c. Similarly, macro eNB 110b may allocate resources, via a PDCCH 134, in a manner that extends the PDSCH for a UE 120b by allocating a portion of a component carrier used by UEs served in the Macro cell 102a.

As will be described in greater detail below, the allocation may be done in a manner designed to "protect" broadcast signals that a UE needs to reliably decode for proper operation. This protection may be accomplished by carefully allocating resources used for downlink transmission in a first cell (an "interfering cell") that overlap with resources allocated for broadcast signals in a second cell (an "interfered cell").

As an example, for a carrier exploiting case, the transmission of certain broadcast signals (e.g., PBCH/PSS/SSS) of some cells (e.g., low power class nodes) may be protected from some interfering cells (e.g., high power class nodes) by allocating resources such that downlink transmissions from the interfering cells avoid using resource blocks (RBs) used for the broadcast signals. As will be described in detail below, there may be various options for accomplishing this protection.

As one illustrative but not limiting example, a first cell may utilize resources of a first component carrier (CC) for a physical downlink shared channel (PDSCH) and "extend" the PDSCH by utilizing resources of a second CC. The resources of the second CC used for the extended PDSCH may overlap with resources used for transmitting broadcast signals in a second cell. Therefore, the broadcast signals may be protected by allocating resources of the second CC used to extend the PDSCH in a manner that attempts to avoid interference with the resources used for the broadcast signals in the second cell.

Figure 2:
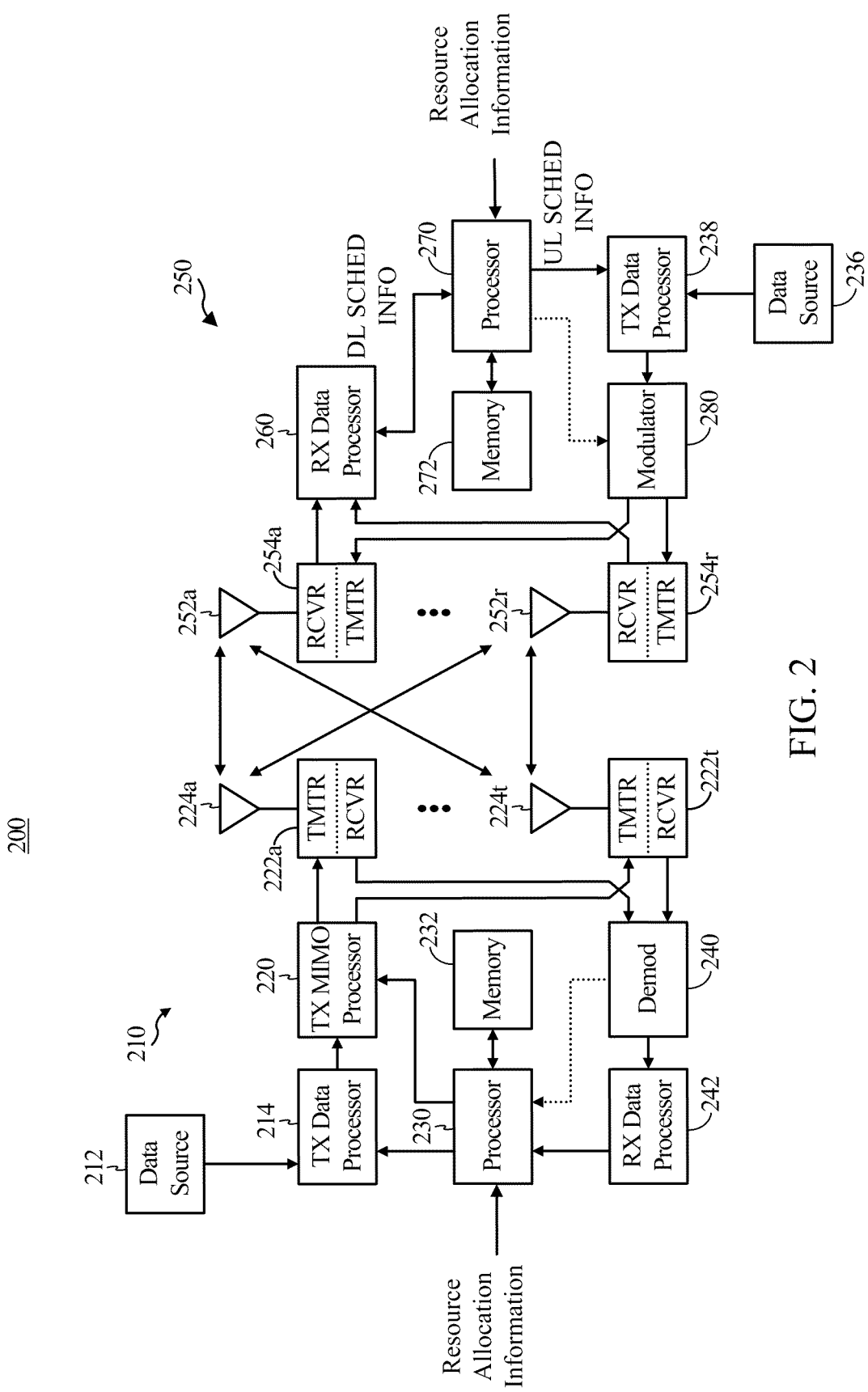
FIG. 2 illustrates a block diagram of example components of an access point and access terminal, in accordance with certain aspects of the disclosure.

FIG. 2 is a block diagram 200 showing example components of an exemplary base station 210 and access terminal 250 in an example wireless system 200. The base station 210 can be an access point or eNB such as one of the eNBs 110 illustrated in FIG. 1 and the access terminal 250 can be a user equipment such as one of the UEs 120 illustrated in FIG. 1.

At the base station 210, traffic data for a number of data streams is provided from a data source 212 to a transmit (TX) data processor 214. A processor 230 may generate control information to be transmitted to the AT 250. As illustrated, the processor 230 may receive resource allocation information indicating how different resources are allocated between different cells in a heterogeneous network. According to certain aspects, the resource allocation information may indicate a set of resources used for transmitting broadcast signals in a different cell (e.g., an "interfered cell"). As will be described below, this information may be used to protect the broadcast signals by allocating resources for downlink transmission in the current cell so they do not interfere with the broadcast signals in the other cell.

The resource allocation information may be exchanged, for example, over a backhaul connection (not shown in FIG. 2) and may be the result of resource negotiations. As such, the resource allocation information may vary over time as negotiations change with varying network conditions. In any case, the processor 230 may utilize this information to generate an appropriate PDCCH sent in a downlink transmission to allocate resources to the AT 250 for use as a PDSCH (or extended PDSCH).

A TX data processor 214 formats, codes, and interleaves the traffic data for each data stream based on a particular coding scheme selected for that data stream to provide coded data. The coded data for the data streams and control information may be multiplexed with pilot data using OFDM techniques.

The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M is generally a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Transmitters 222 receive and process symbol streams for each downlink component carrier to provide one or more analog signals, and further condition (e.g., amplify filter, and upconvert) the analog signals to provide a modulated signal suitable for transmission over the MIMO channel. $N_T$ modulated signals from transmitters 222a through 222t are then transmitted from $N_T$ antennas 224a through 224t, respectively.

At the access terminal 250, the transmitted modulated signals for the downlink component carriers are received by $N_R$ antennas 252a through 252r and the received signal from each antenna 252 is provided to a respective receiver (RCVR) of the receivers 254a through 254r. Each receiver 254 conditions (e.g., filters, amplifies, and downconverts) a respective received signal, digitizes the conditioned signal to provide samples, and further processes the samples to provide a corresponding "received" symbol stream.

A RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream for each configured component carrier to recover the traffic data and control information, for example, including PDSCH and broadcast signals (which may be protected by careful resource allocation in potentially interfering cells as described herein).

The processing by RX data processor 260 may be complementary to that performed by TX MIMO processor 220 and TX data processor 214 at transmitter system 210. A processor 270, coupled to a memory 272, periodically determines which pre-coding matrix to use (discussed below). Processor 270 formulates an uplink message comprising a matrix index portion and a rank value portion.

The processor 270 may receive resource allocation information, for example, for a PDSCH (or extended PDSCH) and broadcast signals. The processor 270 may determine which resources are used for these signals based on this information.

An uplink (reverse link) message may comprise various types of information regarding the communication link and/or the received data stream. The uplink message may then processed by a TX data processor 238, which also receives traffic data for a number of data streams from a data source 236, modulated by a modulator 280, conditioned by transmitters 254a through 254r.

At transmitter system 210, the uplink transmissions from access terminal 250 are received by antennas 224, conditioned by receivers 222, demodulated by a demodulator 240 and processed by a RX data processor 242 to extract the reserve link message transmitted by the receiver system 250. Processor 230 can then determine various parameters, such as which pre-coding matrix to use for determining beamforming weights, and continue processing the extracted message.

As noted above, in systems where multi-carrier operation is supported, a UE may be configured to monitor and be served by two or more component carriers (CCs). In such systems, cross-carrier signaling may be supported in an effort to provide for efficient control. This may be particularly desirable in the context of heterogeneous networks—where different types of cells (e.g., macro, pico, and Femto-cells) are overlayed that have access points that transmit with varying levels of power.

There may be different types of CCs, for example, to provide backward compatibility to UEs compatible earlier versions of a standard ("legacy" UEs). Such a combination of CCs may bring not only enhanced UE throughput, but also more efficient interference management especially for heterogeneous networks. As described herein, a portion of resources of a CC (e.g., a carrier segment or extended carrier) may be used to extend the PDSCH of a (non-legacy) UE.

According to certain aspects, care may be taken in an effort to reduce interference between portions of a CC used for downlink transmissions in a first cell and resources of that same CC used to transmit broadcast signals in a second cell. These broadcast signals may include, for example, Physical Broadcast Channel (PBCH), Primary Synchronization Signal (PSS), Secondary Synchronization Signal (SSS), Common Reference Signal (CRS), Channel State Information Reference Signal (CSI-RS), and the like.

Figure 3:
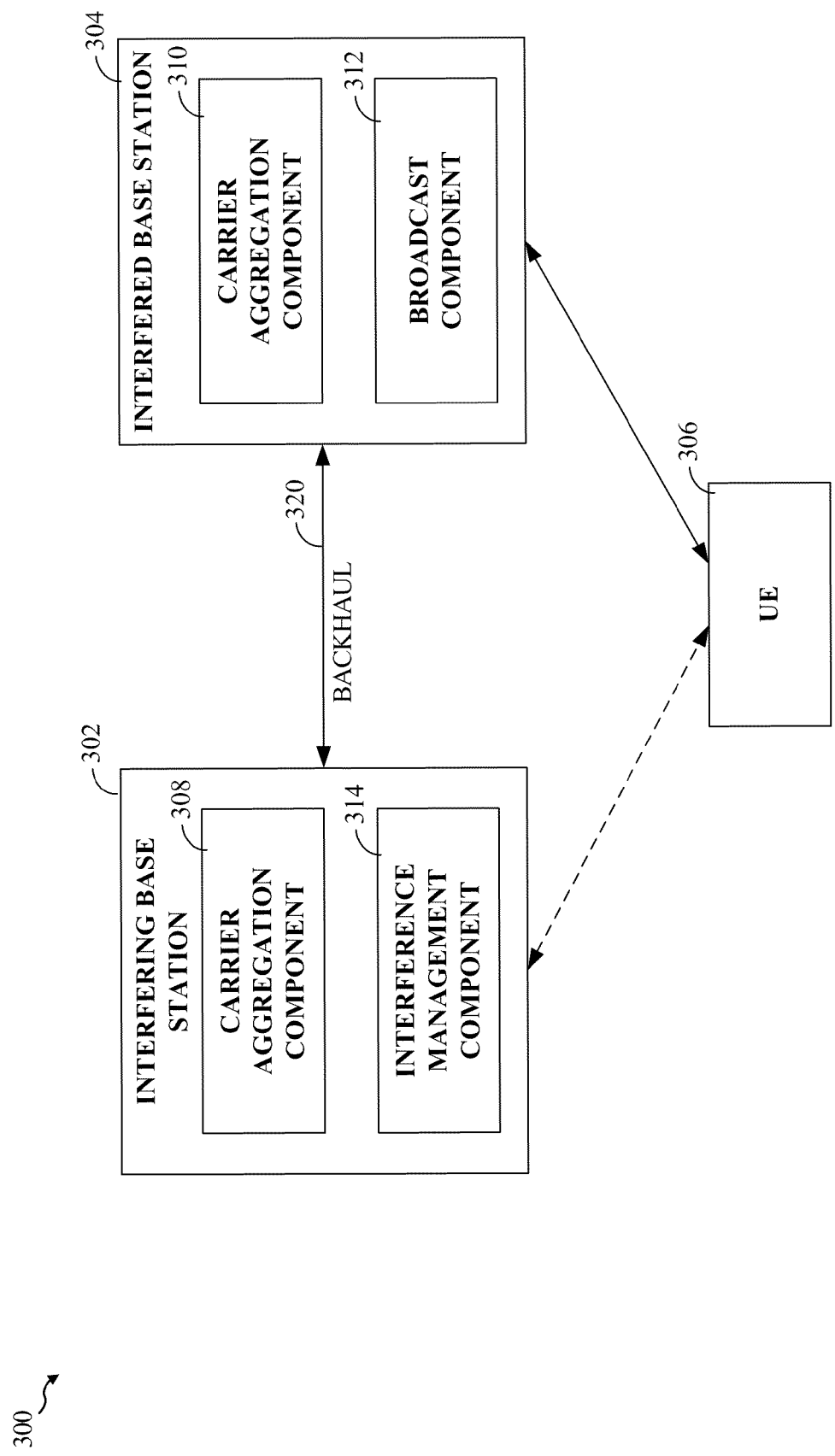
FIG. 3 illustrates example components of a wireless communication system, in accordance with certain aspects of the disclosure.

FIG. 3 illustrates an example communication system 300 capable of protecting broadcast transmissions on CCs in one cell that are also used for downlink transmissions in one or more other cells. As noted above, this may be achieved by coordinated resource allocation, in which different sets of resources are allocated in an effort to reduce interference between downlink transmissions in the other cells with the broadcast signals. As with FIG. 1, interfering transmissions are indicated with a dashed line.

As illustrated, system 300 includes a base station 302 of a first cell (referred to herein as an "interfering base station") and a base station 304 of a second cell (referred to herein as an "interfered base station"). The base stations 302/304 and UE 306 may, each of which may operate in a similar manner to the base stations and UEs described in connection with FIGS. 1-2. According to certain aspects, for multi-carrier operation, the base station 302 or base station 304 may generate allocation information for extending the PDSCH of the UE 304 across multiple carriers. In such cases, the allocation may be performed in an effort to reduce interference between the extended PDSCH and broadcast signals in other cells transmitted using resources in the same CC.

As illustrated, transmissions from interfering base station 302 may interfere with transmissions from interfered base station 304, for example, hindering the ability of a User Equipment (UE) 306 to properly decode signals transmitted from the interfered base station 304. Although not shown, it is contemplated that any number of base stations similar to interfering base station 302 and/or interfered base station 304 may be included in system 300 and/or any number of UEs similar to UE 306 can be included in system 300.

System 300 may be a heterogeneous network, in which different power classes of nodes (e.g., base stations such as interfering base station 302 and interfered based station 304) co-exist. In such systems, UEs (e.g., UE 306 or disparate UE not shown) may observe strong interference in the downlink from nodes from different power class cells. An example is in a closed-subscriber-group (CSG) cell, a Macro UE may not be allowed to access the CSG cell, but the Macro UE may observe strong downlink (DL) interference from the CSG cell, effectively creating a coverage hole for the Macro UE.

Various techniques may be employed to manage such interference attempt to reduce such interference in the context of co-channel deployment. As an example, blank or "almost-blank" subframes (ABSF), where one or more base stations avoid or limit transmissions on one or more subframes (so they appear blank), may allow Time Division Multiplexing (TDM)-based resource management. Interference from interfering cells can be reduced via blank subframes. With "almost" blank subframes, the data region can be completely blank, while the control region may only have Physical Control Format Indicator Channel (PCFICH), omitting transmission of Physical HARQ ACK/NAK Indicator Channel (PHICH)/Physical Downlink Control Channel (PDCCH). Further, transmit power of higher power class nodes may be reduced, to approximate homogeneous networks, albeit at the risk of potentially shrinking Macro cell coverage.

The use of multiple carriers may also help reduce interference. Following this example, interfering base station 302 can include a carrier aggregation component 308 and interfered base station 304 can include a carrier aggregation component 310. Carrier aggregation component 308 and carrier aggregation component 310 may enable the aggregation of contiguous and/or non-contiguous spectrum for UEs to have access to corresponding Physical Layer (PHY) resources. According to certain aspects, resource allocation from one carrier to another carrier may be enabled via the use of the agreed 'carrier indicator field' embedded in PDCCH. Carrier aggregation component 308 and carrier aggregation component 310 may implement one or more non-backward-compatible concepts such as, for instance, carrier extension (segments) and extension carriers.

As illustrated, the interfered base station 304 can further include a broadcast component 312 that can send broadcast signals over a downlink on a particular CC. Unfortunately, downlink data transmission using Physical Downlink Shared Channel (PDSCH) sent by the interfering base station 302 may overlap with resources used to transmit the broadcast signals.

In an effort to avoid interference between PDSCH transmissions and the broadcast signals of the interfered base station 304, the interfering base station 302 may include an interference management component 314 that can manage interference using techniques described herein. According to certain aspects, the interference management component 314 may exchange information regarding resources utilized by the interfered base station 304 for transmitting broadcast signals via a backhaul link 320.

Figure 4:
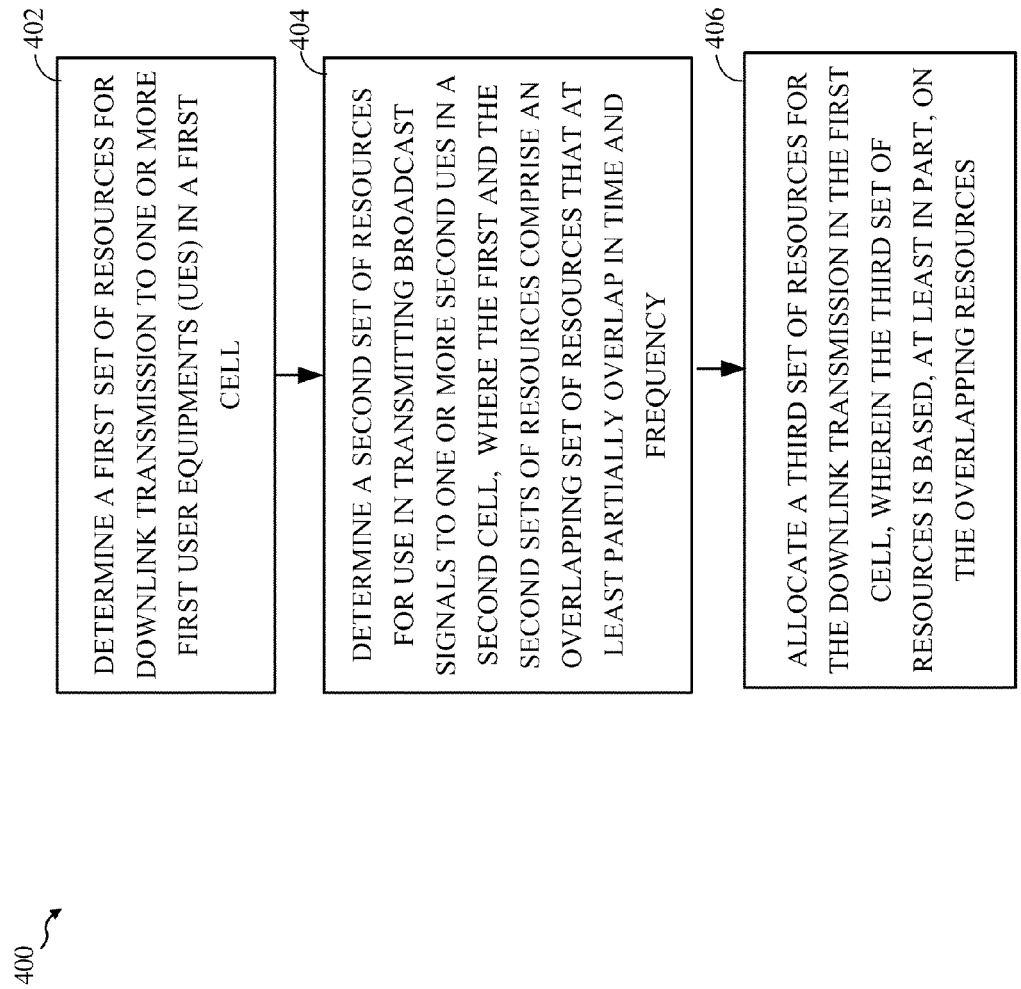
FIG. 4 illustrates example operations for allocating resources, in accordance with certain aspects of the disclosure.

FIG. 4 illustrates example operations 400 that may be performed, for example, by an interfering base station 304, for protecting broadcast signals, in accordance with certain aspects of the disclosure. A base station performing these operations may be as described in connection with any of FIGS. 1-3. For instance, exemplary operations 400 may be directed by one or more processors (such as processor 230), or by one or more components (such as components 308-314).

At 402, the base station determines a first set of resources for downlink transmission to one or more first user equipments (UEs) in a first cell. At 404, the base station determines a second set of resources for use in transmitting broadcast signals to one or more second UEs in a second cell, where the first and the second set of resources comprise an overlapping set of resources that at least partially overlap in time and frequency. At 406, the base station allocates a third set of resources for the downlink transmission in the first cell, wherein the third set of resources is based, at least in part, on the overlapping set of resources. According to certain aspects, the third set of resources may comprise a subset of the first set of resources. According to certain aspects, transmission utilizing resources in the first set (but not resources in the third set) may be performed with zero-power (thus conventional mapping may be utilized, but with power control to protect broadcast signals).

The techniques presented herein may be used to protect broadcast signals in one cell from interference by downlink transmissions in another cell. This protection may be achieved by careful allocation of resources for downlink transmissions in an interfering (or potentially interfering) cell, based on knowledge of resources allocated for transmitting the broadcast signals in the interfered cell (or potentially interfered cell).

In various systems, such as LTE "Advanced" (LTE-A), carrier aggregation enables the aggregation of contiguous or non-contiguous spectrum for UEs to have access to corresponding PHY resources. Resource allocation from one carrier to another carrier may be enabled. As an example, it can be enabled via the use of an agreed-upon carrier indicator field (CIF) embedded in the PDCCH. As another example, it can be enabled by treating the carriers in aggregation as one carrier in terms of resource assignment, especially in the case of carrier extensions detailed below.

In order to extend PDSCH, different mechanisms outside a primary CC may be used, such as carrier extension (segments) and extension carriers. As used herein, the term carrier segments generally refers to segments that are defined as bandwidth extensions of an existing (e.g., LTE Rel-8 compatible) component carrier (which is typically no larger than 110 RBs in total). A carrier segment may allow utilization of frequency resources in case new transmission bandwidths are needed in a backwards compatible way complementing carrier aggregation means. This mechanism may reduce additional PDCCH transmissions that would be required in a carrier aggregation setting and also reduce the use of small TB sizes for the part corresponding to the segment. Thus, a carrier segment may allow aggregating additional resource blocks to a component carrier, while still retaining the backward compatibility of the original carrier bandwidth. Carrier segments may be defined as always adjacent and linked to one component carrier (and not used "stand-alone"). Carrier segments may also be limited in their use, for example, not providing synchronization signals, system information, or paging.

Figure 5:
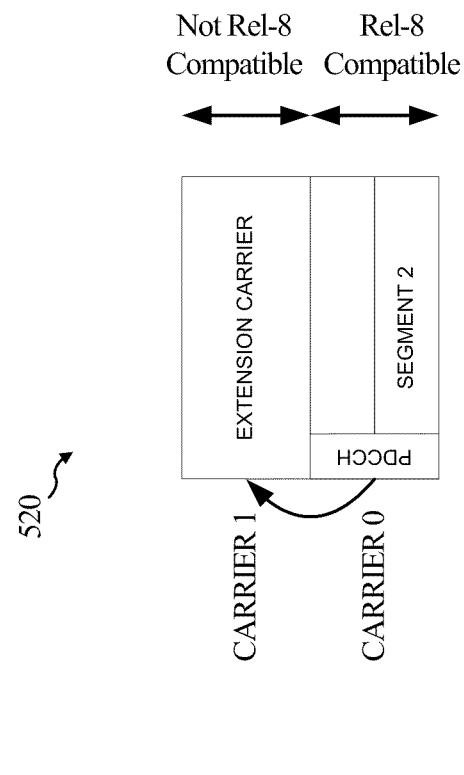
FIG. 5 illustrates examples of a carrier segment and extension carrier, in accordance with certain aspects of the disclosure.
Figure 5:
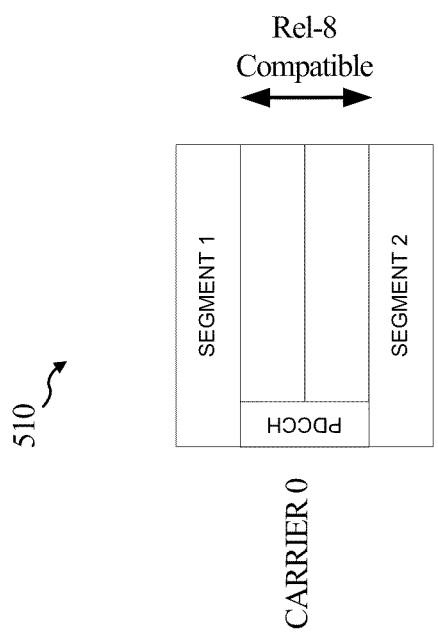

Diagram 510 in FIG. 5 illustrates example carrier segments (Segment 1 and Segment 2) adjacent to a component carrier (Carrier 0), illustratively backward-compatible with LTE Rel. 8. As noted, the segments are an extension of the CC and, thus, the CC with extension(s) may be considered a single HARQ entity. Allocation of one or more of the extensions for use in extending the PDSCH may be made in the PDCCH in Carrier 0.

Extension carriers may be designed with a similar philosophy as carrier segments. However, an extension carrier may be an actual component carrier itself, which may or may not be backward compatible (with Rel-8 UEs). The backward compatible carrier and the extension carrier, being two different component carriers, may assume independent H-ARQ processes and transport blocks.

Diagram 520 in FIG. 5 illustrates example extension carrier (Carrier 1) linked to a backward-compatible component carrier (Carrier 0). As noted, the extension carrier may be an actual component carrier and, thus, may be treated as an independent HARQ entity. Again, allocation of the extension carrier for use in extending the PDSCH may be made in the PDCCH in Carrier 0.

As shown in FIG. 5, extension carriers and carrier segments may be linked to a backward compatible component carrier and, in some cases, may not be used in a stand-alone manner. Use of the extension carriers and/or segments may be limited to prohibit their use for conveying synchronization signals, system information, paging for UEs, and various control channels, such as Rel-8 PDCCH, Rel-8 PHICH, and Rel-8 PCFICH. Further, these extension mechanisms may be prohibited for use in random access or UE camping. Extension carriers and segments may not be recognized and/or accessible by LTE Rel 8 ("legacy") UEs.

The use of these carrier aggregation mechanisms in heterogeneous networks (HetNets) proposed herein may allow semi-static partitioning of spectrum for high power nodes (e.g., macro UEs) and low power nodes (e.g., femto/pico nodes UEs). According to certain aspects, extension carriers and carrier segments may be suitable for interference management for HetNets. In this case, different portions of the spectrum may be interpreted differently by different type of nodes.

Figure 6:
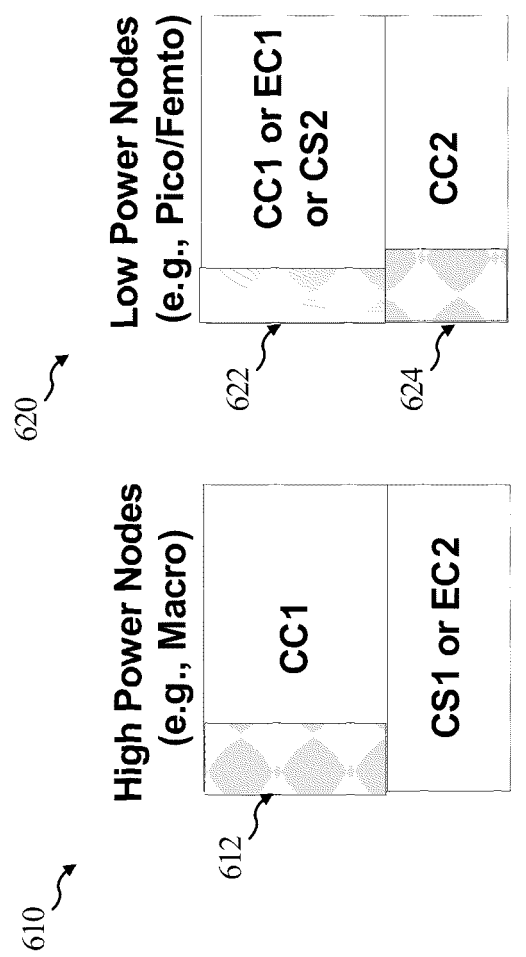
FIG. 6 illustrates examples of extended physical downlink shared channel resources, in accordance with certain aspects of the disclosure.

For example, as illustrated in the resource diagram 610 of FIG. 6, an extended PDSCH for a high power node may comprise one backward compatible carrier (CC1) and an extended PDSCH region comprising at least one carrier segment (CS1) or extension carrier (EC2) which may be of a second component carrier (CC2). According to certain aspects, legacy UEs (e.g., Rel-8 or older) may be served within CC1 only, while non-legacy UEs (Rel-9 or higher) may be served by both CC1 and CS1/EC2. As illustrated, however, the allocation of resources in CS1/EC2 may be via the control region 612 in CC1.

It should be noted that the diagram 610 in FIG. 6 represents an example interpretation of available spectrum from the perspective of a high power node. Diagram 650, on the other hand, represents an example interpretation of the same spectrum from the perspective of a low power node. As illustrated, from the perspective of the low power node, the extended PDSCH may include one backward compatible carrier (CC2), and extension carrier(s) EC1 or carrier segment(s) CS2 or a component carrier (CC1). In this example, CC2, being backward compatible, carries the control region, and can signal the resources for EC1/CS2/CC1. The mapping of PDSCH in EC1/CS2/CC1 in this case assigned from CC2 starts from an OFDM symbol conveyed by CC2 to the UE (or at a fixed OFDM symbol). In this example, EC1/CS2 does not carry control region, rather CC1 carries the regular control channel.

As illustrated above, with this arrangement, different parts of the spectrum may be interpreted differently by different type of node. In general, high power nodes and low power nodes may be arranged such that low power nodes using CC2 is free of interference in the control region, if the high power nodes do not transmit in the symbols using CS1 or EC2 colliding with the control region of the lower nodes using CC2.

According to certain aspects, resources for the "extended PDSCH" may be allocated in a manner that attempts to avoid high power node data interfering with low power node broadcast signals (e.g., since legacy broadcast signals may be transmitted on CC2 by low power nodes). According to certain aspects, symbols in resource blocks (RBs) used for transmitting the broadcast signals (or the entire RBs) may be avoided when transmitting the extended PDSCH.

For example, by exchanging resource partitioning information (e.g., via backhaul connections), node Bs may be able to schedule resources in this manner to avoid interference between broadcast signals sent in the control region 624 (e.g., corresponding to control region of the high power node) and an extended PDSCH of the high power node. Interference avoidance may be accomplished, for example, by avoiding RBs used to transmit broadcast signals by a low power node in CC2 when allocating resources for an extended PDSCH for another node.

While CS1 or EC2 of the high power nodes may be transparent to "legacy UEs" (e.g., those compatible with LTE Rel-8 or earlier), "non-legacy UEs" (e.g., those compatible with later releases, such as Rel-10 or higher) may be scheduled with PDCCH transmitted on CC1 of the high power nodes (cross-carrier signaling). Depending on interference management schemes, the transmit power of the data region of CS1 or EC2 can be significantly higher than that of CC2, consequently causing severe interference to CC2. To mitigate the issue, backhaul information exchange or resource allocation information may be used to coordinate the involved cells.

Figure 7:
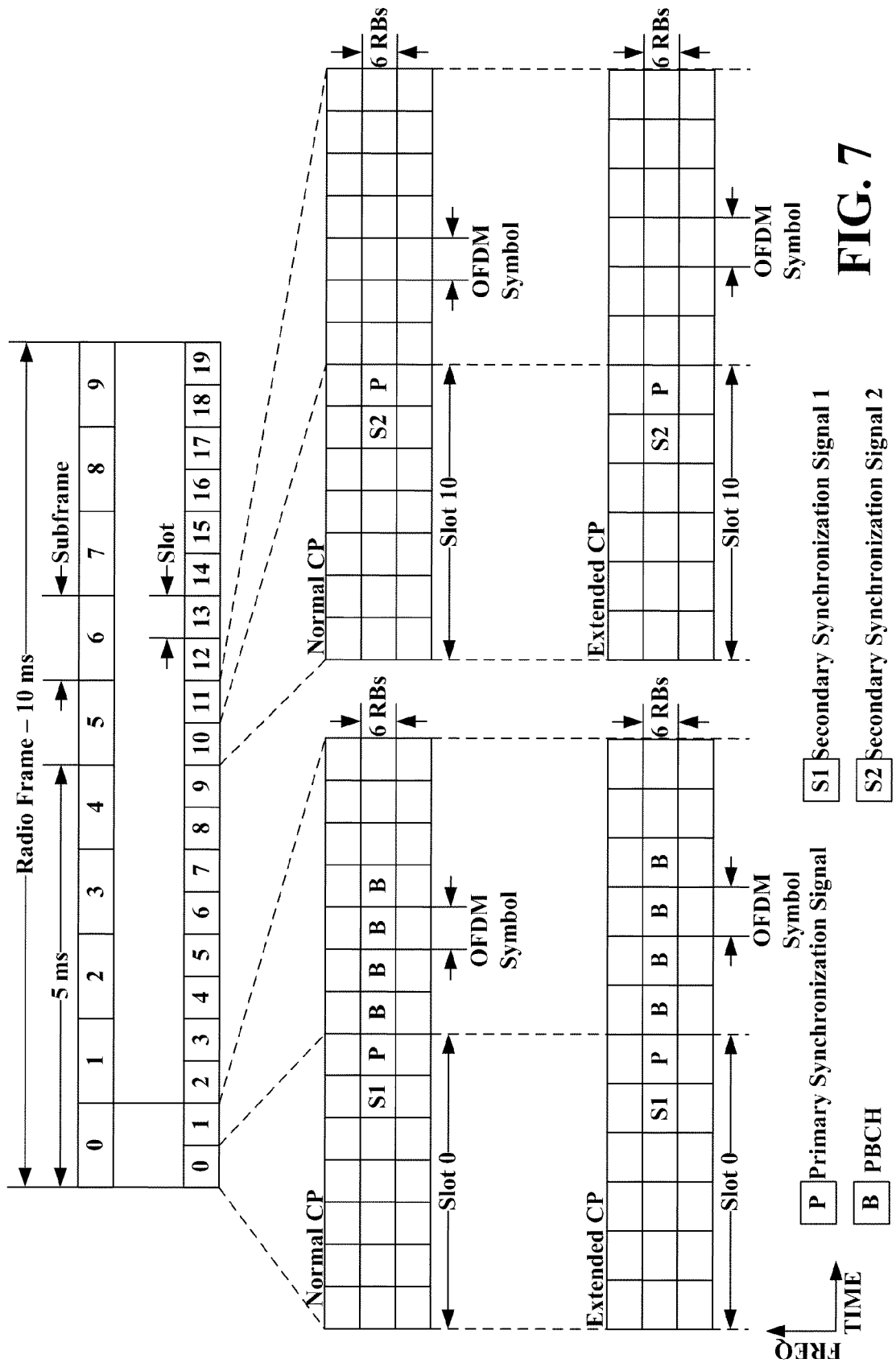
FIG. 7 illustrates an example FDD frame with broadcast signals to be protected, in accordance with certain aspects of the disclosure.

For the low power class nodes, UEs served by CC2 may need to reliably decode various broadcast signals transmitted from CC2 for proper operation. These broadcast signals can include PBCH, PSS, SSS, CRS, etc. The transmission of PBCH, PSS and SSS typically occupy some of the symbols in the center six Resource Blocks of the system. This is illustrated in FIG. 7, which shows an example radio frame depicting resources utilized for PBCH, PSS, and SSS in an FDD system.

According to an example, broadcast signals may be protected by having a (potentially) interfering base station avoid transmitting on the downlink using those symbols in the center 6 RBs (or the entire group of these RBs) in the subframes that would collide with those symbols/subframes carrying PBCH/PSS/SSS of the interfered cells (e.g., as sent by broadcast component 312 of interfered base station 304). If interfering base station 302 schedules PDSCH overlapping with these 6 RBs, then interference management component 314 can rate-match around or puncture these 6 RBs and within these 6 RBs, using only the remaining symbols, or avoiding these RBs in their entirety.

As another example of protecting broadcast signals, if (demodulation of) the colliding PDSCH on interfering base station 302 is based on CRS, then interference management component 314 may be configured to cause PDSCH to be rate-matched around the symbols colliding with those of PBCH/PSS/SSS of the interfered cells (e.g., as sent by broadcast component 312 of interfered base station 304). On the other hand, if (demodulation of) the colliding PDSCH on interfering base station 302 is based on UE-RS, then the interference management component 314 may be configured to cause PDSCH to be rate-matched around or the entire overlapping RBs can be punctured.

As another example, interfering base station 302 can transmit those PDSCH which is rate matched around CRS tones for the interfered cells. Thus, interference management component 314 can cause interfering base station 302 to signal to UEs associated therewith.

Interfering base station 302 may transmit PDSCH and puncture those tones where CRS tones are transmitted for the interfered cells. This operation may be transparent to the UEs associated with interfering base station 302. Interfering base station 302 may selectively puncture those CRS tones based on projected interference to those interfered cells. In other words, interfering base station 302 may at least reserve those symbols in the corresponding subframes colliding with those of PBCH/PSS/SSS/CRS of the cells requiring interference protection. This may allow reliable broadcast signal (e.g., PBCH/PSS/SSS) detection for the UEs served by the interfered cells.

Whether an interfering base station chooses to reserve some symbols or RBs for the purpose of minimizing interference to protect transmission of broadcast signals from other cells may depend on various factors, such as a difference in power class, antenna gain, proximity among the involving cells, UE distributions/channel conditions in the involving cells, scheduling algorithms, Quality of Service (QoS) requirements, and/or one or more resource management schemes. The reservation information may also be exchanged over a backhaul link between involved cells for more efficient interference management.

It should be noted that in some synchronous systems, broadcast signals from different cells may collide with each other. Alternatively, the broadcast signals of different cells may not occur in the same subframes, and/or not be completely overlap in a single subframe. Thus, resource reservation described herein to protect broadcast signals may span more than one subframe in the interfered cell.

According to other aspects, the above techniques described with reference to PBCH, PSS, and SSS may also be applied to Channel State Information-Reference Signal (CSI-RS) that may be introduced in later releases (e.g., Rel-10).

It may also be noted that the interfering cells need to accommodate protection of broadcast signals for more than one interfered cell, if these interfered cells do not have the same REs for broadcast signals. In such cases, according to certain aspects, the interfering cells may choose to perform the RE reservation only one (or only a selected set) of the interfered cells. According to certain aspects, this selection may be based on various factors, such as channel conditions, loading, QoS, and the like. Such information may be exchanged over backhaul.

As an example of this selection, if a first cell (Cell 1) interferes with second and third cells (Cell 2 and Cell 3), the reservation can be such that cell 1 only reserves REs in a manner that protects broadcast transmissions on Cell 2, but not Cell 3. Such a decision may be based on a condition such as, for example, that Cell 2 is more sensitive than Cell 3 to interference from Cell 1. According to another example, if Cell 1 interferes with Cell 2 and Cell 3, the reservation may be such that Cell 1 protects broadcast transmissions on both Cell 2 and Cell 3 (e.g., by reserves REs for both).

The disclosure provides for the application of extension carriers and carrier segments in the context of heterogeneous networks, while protecting broadcast signal transmission by other nodes. As described herein, different parts of the spectrum may be interpreted differently by different type of nodes.

The various illustrative logical blocks, modules and circuits described in connection with the disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the disclosure, other and further aspects of the disclosure may be devised without departing from the basic scope thereof, and the scope thereof is determined by the claims that follow.

What is claimed is:

1. A method for wireless communications in wireless communications network, comprising:
   determining a first set of resources for downlink transmission to a first user equipment (UE) in a first cell;
   determining a second set of resources for use in transmitting broadcast signals to a second UE in a second cell, wherein the first set of resources and the second set of resources comprise an overlapping set of resources that at least partially overlap in time and frequency; and
   allocating a third set of resources for the downlink transmission in the first cell, wherein the third set of resources is allocated to mitigate interference by the downlink transmission in the first cell to transmissions in the second cell using the second set of resources and the third set of resources is allocated based, at least in part, on the overlapping set of resources.

2. The method of claim 1, wherein the broadcast signals comprise at least one of a physical broadcast channel (PBCH), a primary synchronization signal (PSS), a secondary synchronization signal (SSS), a common reference signal (CRS), or a channel state information reference signal (CSI-RS).

3. The method of claim 1, wherein the third set of resources comprises a subset of the first set of resources.

4. The method of claim 1, wherein resources in the first set of resources that are not used for the downlink transmission comprise all or a subset of the overlapping set of resources.

5. The method of claim 4, wherein demodulation of the downlink transmission is based on a common reference signal (CRS).

6. The method of claim 1, wherein resources in the first set of resources that are not used for the downlink transmission comprise all the overlapping set of resources and at least one additional resource within the first set of resources.

7. The method of claim 6, wherein the at least one additional resource is in a same set of resource blocks as the overlapping set of resources.

8. The method of claim 1, wherein:
   the wireless communications network comprises a heterogeneous network; and
   the first cell and the second cell are of different power class types.

9. The method of claim 1, wherein the downlink transmission utilizes a physical downlink shared channel (PDSCH).

10. The method of claim 9, wherein mapping of modulated and coded symbols of the PDSCH does not utilize resources which are in the first set of resources but not in the third set of resources.

11. The method of claim 9, wherein:
   mapping of modulated and coded symbols of the downlink transmission utilize resources in the first set of resources; and
   transmission utilizing resources in the first set of resources but not resources in the third set of resources is performed with zero-power.

12. The method of claim 1, further comprising exchanging information regarding at least one of resources in the first set of resources or the second set of resources over a backhaul connection between the first cell and the second cell.

13. The method of claim 1, wherein the downlink transmission in the first cell comprises at least one of a common reference signal (CRS), a channel state information reference signal (CSI-RS), or a combination thereof.

14. The method of claim 1, wherein the downlink transmission in the first cell is transmitted in an almost blank subframe (ABSF).

15. The method of claim 1, wherein a carrier of the first cell comprises at least one of a carrier segment or an extension carrier that is not backward compatible with Long Term Evolution, Release 9 or earlier releases.

16. An apparatus for wireless communications in wireless communications network, comprising:
   means for determining a first set of resources for downlink transmission to a first user equipment (UE) in a first cell;
   means for determining a second set of resources for use in transmitting broadcast signals to a second UE in a second cell, wherein the first set of resources and the second set of resources comprise an overlapping set of resources that at least partially overlap in time and frequency; and means for allocating a third set of resources for the downlink transmission in the first cell, wherein the third set of resources is allocated to mitigate interference by the downlink transmission in the first cell to transmissions in the second cell using the second set of resources and the third set of resources is allocated based, at least in part, on the overlapping set of resources.

17. The apparatus of claim 16, wherein the broadcast signals comprise at least one of a physical broadcast channel (PBCH), a primary synchronization signal (PSS), a secondary synchronization signal (SSS), a common reference signal (CRS), or a channel state information reference signal (CSI-RS).

18. The apparatus of claim 16, wherein the third set of resources comprises a subset of the first set of resources.

19. The apparatus of claim 16, wherein resources in the first set of resources that are not used for the downlink transmission comprise all or a subset of the overlapping set of resources.

20. The apparatus of claim 19, wherein demodulation of the downlink transmission is based on a common reference signal (CRS).

21. The apparatus of claim 16, wherein resources in the first set of resources that are not used for the downlink transmission comprise all the overlapping set of resources and at least one additional resource within the first set of resources.

22. The apparatus of claim 21, wherein the at least one additional resource is in a same set of resource blocks as the overlapping set of resources.

23. The apparatus of claim 16, wherein:
the wireless communications network comprises a heterogeneous network; and
the first cell and the second cell are of different power class types.

24. The apparatus of claim 16, wherein the downlink transmission utilizes a physical downlink shared channel (PDSCH).

25. The apparatus of claim 24, wherein mapping of modulated and coded symbols of the PDSCH does not utilize resources which are in the first set of resources but not in the third set of resources.

26. The apparatus of claim 24, wherein:
mapping of modulated and coded symbols of the downlink transmission utilize resources in the first set of resources; and
transmission utilizing resources in the first set of resources but not resources in the third set of resources is performed with zero-power.

27. The apparatus of claim 16, further comprising means for exchanging information regarding at least one of resources in the first set of resources or the second set of resources over a backhaul connection between the first cell and the second cell.

28. The apparatus of claim 16, wherein the downlink transmission in the first cell comprises at least one of a common reference signal (CRS), a channel state information reference signal (CSI-RS), or a combination thereof.

29. The apparatus of claim 16, wherein the downlink transmission in the first cell is transmitted in an almost blank subframe (ABSF).

30. The apparatus of claim 16, wherein a carrier of the first cell comprises at least one of a carrier segment or an extension carrier that is not backward compatible with Long Term Evolution, Release 9 or earlier releases.

31. An apparatus for wireless communications in wireless communications network, comprising:
at least one processor configured to:
determine a first set of resources for downlink transmission to a first user equipment (UE) in a first cell,
determine a second set of resources for use in transmitting broadcast signals to a second UE in a second cell, wherein the first set of resources and the second set of resources comprise an overlapping set of resources that at least partially overlap in time and frequency, and
allocate a third set of resources for the downlink transmission in the first cell, wherein the third set of resources is allocated to mitigate interference by the downlink transmission in the first cell to transmissions in the second cell using the second set of resources and the third set of resources is allocated based, at least in part, on the overlapping set of resources; and
a memory coupled with the at least one processor.

32. The apparatus of claim 31, wherein the broadcast signals comprise at least one of a physical broadcast channel (PBCH), a primary synchronization signal (PSS), a secondary synchronization signal (SSS), a common reference signal (CRS), or a channel state information reference signal (CSI-RS).

33. The apparatus of claim 31, wherein the third set of resources comprises a subset of the first set of resources.

34. The apparatus of claim 31, wherein resources in the first set of resources that are not used for the downlink transmission comprise all or a subset of the overlapping set of resources.

35. The apparatus of claim 34, wherein demodulation of the downlink transmission is based on a common reference signal (CRS).

36. The apparatus of claim 31, wherein resources in the first set of resources that are not used for the downlink transmission comprise all the overlapping set of resources and at least one additional resource within the first set of resources.

37. The apparatus of claim 36, wherein the at least one additional resource is in a same set of resource blocks as the overlapping set of resources.

38. The apparatus of claim 31, wherein:
the wireless communications network comprises a heterogeneous network; and
the first cell and the second cell are of different power class types.

39. The apparatus of claim 31, wherein the downlink transmission utilizes a physical downlink shared channel (PDSCH).

40. The apparatus of claim 39, wherein mapping of modulated and coded symbols of the PDSCH does not utilize resources which are in the first set of resources but not in the third set of resources.

41. The apparatus of claim 39, wherein:
mapping of modulated and coded symbols of the downlink transmission utilize resources in the first set of resources; and
transmission utilizing resources in the first set of resources but not resources in the third set of resources is performed with zero-power.

42. The apparatus of claim 31, wherein the at least one processor is further configured to exchange information regarding at least one of resources in the first set of resources or second set of resources over a backhaul connection between the first cell and the second cell.

43. The apparatus of claim 31, wherein the downlink transmission in the first cell comprises at least one of a common reference signal (CRS), a channel state information reference signal (CSI-RS), or a combination thereof.

44. The apparatus of claim 31, wherein the downlink transmission in the first cell is transmitted in an almost blank subframe (ABSF).

45. The apparatus of claim 31, wherein a carrier of the first cell comprises at least one of a carrier segment or an extension carrier that is not backward compatible with Long Term Evolution, Release 9 or earlier releases.

46. A computer-program product for wireless communications comprising a non-transitory computer-readable storage medium having instructions stored thereon, the instructions executable by a processor for:
- determining a first set of resources for downlink transmission to a first user equipment (UE) in a first cell;
- determining a second set of resources for use in transmitting broadcast signals to a second UE in a second cell, wherein the first set of resources and the second set of resources comprise an overlapping set of resources that at least partially overlap in time and frequency; and
- allocating a third set of resources for the downlink transmission in the first cell, wherein the third set of resources is allocated to mitigate interference by the downlink transmission in the first cell to transmissions in the second cell using the second set of resources and the third set of resources is allocated based, at least in part, on the overlapping set of resources.

* * * * *